United States Patent
Amagasa et al.

(10) Patent No.: US 12,172,608 B2
(45) Date of Patent: Dec. 24, 2024

(54) WIPER CONTROL METHOD AND WIPER CONTROL DEVICE

(71) Applicant: MITSUBA Corporation, Gunma (JP)

(72) Inventors: Toshiyuki Amagasa, Gunma (JP); Daichi Munekata, Gunma (JP)

(73) Assignee: MITSUBA Corporation, Gunma (JP)

( * ) Notice: Subject to any disclaimer, the term of this patent is extended or adjusted under 35 U.S.C. 154(b) by 180 days.

(21) Appl. No.: 17/791,902

(22) PCT Filed: Oct. 28, 2021

(86) PCT No.: PCT/JP2021/039757
§ 371 (c)(1),
(2) Date: Jul. 10, 2022

(87) PCT Pub. No.: WO2022/145126
PCT Pub. Date: Jul. 7, 2022

(65) Prior Publication Data
US 2023/0050203 A1    Feb. 16, 2023

(30) Foreign Application Priority Data
Dec. 28, 2020   (JP) .................. 2020-218486

(51) Int. Cl.
*B60S 1/08*   (2006.01)
(52) U.S. Cl.
CPC .................. *B60S 1/0862* (2013.01)
(58) Field of Classification Search
CPC ......... B60S 1/08; B60S 1/0862; B60S 1/0896
See application file for complete search history.

(56) References Cited

U.S. PATENT DOCUMENTS

| | | | |
|---|---|---|---|
| 6,281,649 B1 * | 8/2001 | Ouellette | B60S 1/08 318/443 |
| 2009/0282636 A1 * | 11/2009 | Braun | B60S 1/08 318/444 |
| 2012/0325265 A1 | 12/2012 | Amagasa | |

FOREIGN PATENT DOCUMENTS

| | | | | |
|---|---|---|---|---|
| DE | 102009014767 A1 * | 9/2010 | | B60S 1/08 |
| JP | 2002512919 | 5/2002 | | |
| JP | 2003040087 | 2/2003 | | |

(Continued)

OTHER PUBLICATIONS

DE102009014767A1 machine translation (Year: 2010).*

(Continued)

*Primary Examiner* — Douglas Lee
(74) *Attorney, Agent, or Firm* — JCIPRNET

(57) ABSTRACT

In a wiper device for vehicles, overrun at inversion positions is suppressed while a wind load and a high load are dealt with. A wiper device includes: a wiper blade; a wiper arm to which the wiper blade is attached; and a motor for driving the wiper arm. A load generated in the motor when the wiper blade moves on a windshield is estimated and calculated based on a motor supply current amount and the like. When an outward load generated in the wiper motor exceeds a predetermined threshold value, a high load correction process is performed based on the outward load. When the outward load is less than or equal to the threshold value, a wind load correction process is performed based on a wind load calculated from a difference between the outward load and the return load.

6 Claims, 6 Drawing Sheets

(56) References Cited

FOREIGN PATENT DOCUMENTS

| JP | 2011131778 | 7/2011 |
| JP | 2011131779 | 7/2011 |

OTHER PUBLICATIONS

"International Preliminary report on patentability (Form PCT/IB/326) mailed on Jul. 13, 2023, International Preliminary report on patentability (Form PCT/IB/373) issued Jul. 4, 2023, International Preliminary report on patentability (Form PCT/IB/338) mailed on Jul. 13, 2023, and Written Opinion (Form PCT/ISA/237) with English translation thereof mailed on Dec. 7, 2021, of PCT/JP2021/039757", pp. 1-9.

"International Search Report (Form PCT/ISA/210) of PCT/JP2021/039757," mailed on Dec. 7, 2021, pp. 1-3.

* cited by examiner (a)

(b)

WIPER CONTROL METHOD AND WIPER CONTROL DEVICE

CROSS-REFERENCE TO RELATED APPLICATION

This application is a 371 application of the International PCT application serial no. PCT/JP2021/039757, filed on Oct. 28, 2021, which claims the priority benefits of Japan Patent Application No. 2020-218486, filed on Dec. 28, 2020. The entirety of each of the above-mentioned patent applications is hereby incorporated by reference herein and made a part of this specification.

TECHNICAL FIELD

The disclosure relates to a control technique for a wiper device for vehicles, and more particularly to a wiper control method and a wiper control device capable of suppressing overrun at an inversion position and setting a wider wiping area.

RELATED ART

In the wiper device for a vehicle, the load received by the wiper blade/wiper arm (hereinafter abbreviated as a blade and the like) due to the wind during traveling differs between the outward operation (bottom to top) and the return operation (top to bottom). That is, in the outward operation, the blades and the like are pushed up by the wind, and the load decreases, whereas in the return operation, the blades and the like are pushed back by the wind during traveling, and the load increases accordingly. For this reason, conventionally, the so-called control wiper that controls the wiping operation according to the position of the blade and the like and the motor output detects the difference in motor output based on the difference in load between the outward operation and the return operation, and the influence of wind load is adjusted as appropriate. There, the operating angle of the wiper motor is corrected according to the difference in motor output (wind load correction), and overrun of blades and the like at the upper inversion position is suppressed.

Further, in the control wiper, in addition to the wind load response control as described above, in order to cope with the load (surface load) of the blade or the like that changes depending on the state on the surface to be wiped or the like, high load correction (surface load correction) that controls the operation of the wiper motor is also performed based on the detection values such as motor rotation speed, vehicle traveling speed, atmospheric temperature, motor current and the like, in addition to the motor output. FIG. 5 is a flowchart showing a wiper control mode in a conventional control wiper. As shown in FIG. 5, here, the correction amount in the high load correction and the correction amount in the wind load correction are calculated according to the wiper operation (steps S11 and S12; hereinafter, "step" is omitted and abbreviated as S11).

After calculating each correction amount, the process proceeds to S13, and the two are compared. At this time, if the high load correction amount is larger than the wind load correction amount, the process proceeds to S14, and the high load correction is performed. On the other hand, if the wind load correction amount is larger than the high load correction amount, the process proceeds to S15, and the wind load correction is performed. That is, the correction amounts due to the two loads are compared and examined, and the control mode having the larger correction amount is selected, and the wiper control is performed according to the current situation of the blade and the like.

CITATION LIST

Patent Literature

[Patent Literature 1] Japanese Patent Lain-Open No. 2002-512919.

SUMMARY

Technical Problem

In addition, at the time of high load, the correction amount by the wind load correction becomes small. FIG. 6 is an illustration diagram showing a motor load due to a wind during traveling, in which (a) shows the time of low load, and (b) shows the time of high load, respectively. As shown in (a) of FIG. 6, in the case of a wind load, the influence of the wind has a plus/minus relationship between the outward path and the return path; therefore, the difference X between the motor loads on the outward path and the return path becomes large at the time of low load. On the other hand, at the time of high load, as shown in (b) of FIG. 6, the amount of load does not change much between the outward path and the return path, and the difference X between the two becomes small, and the correction amount becomes small accordingly.

Therefore, for example, when the wiper device is operated during traveling in light rain, the surface to be wiped is not so wet and the load is not high, but the operating load of the blade is larger than that at the time of heavy rain. At this time, if the wind load correction amount is larger than the high load correction amount, the process proceeds from S13 to S15 in FIG. 5, and the wind load correction is performed. In this case, the wind load correction amount is smaller than that at the time of low load as in the case of (b) of FIG. 6, and the correction amount of the blade stop position at the upper inversion position is also set to a relatively small value.

However, although the windshield is not very wet during light rain or the like, water may accumulate in the vicinity of the pillars, and the accumulated water may cause the surface to be wiped in the vicinity of the upper inversion position to become wet. Then, the load on the blade suddenly fluctuates (stick slip) in the vicinity of the upper inversion position of the outward operation, and the blade may slip. However, the correction amount at this time is set small as described above, and it is difficult to correct the sudden state change, and there is a problem that overrun may occur at the upper inversion position.

The disclosure provides a wiper control method and a wiper control device capable of suppressing overrun at an inversion position while coping with a wind load and a high load.

Solution to Problem

A wiper control method according to the disclosure is a method for controlling a wiper device, and the wiper device includes: a wiper blade disposed on a windshield of a vehicle; a wiper arm to which the wiper blade is attached and is driven back and forth between an upper inversion position and a lower inversion position set on the windshield; and a motor for driving the wiper arm. The wiper control method includes: detecting an outward load generated in the motor when the wiper blade moves from the lower inversion position to the upper inversion position; correcting an operation of the wiper arm by a first correction value set based on the outward load when the outward load of the motor exceeds a predetermined threshold value; and correcting the operation of the wiper arm by a second correction value set based on a wind load of the motor generated by a wind received by the vehicle during traveling when the outward load is less than or equal to the threshold value.

In the disclosure, the load of the motor due to the state of the surface to be wiped in the outward path is determined, and if it exceeds the threshold value, the operation of the wiper arm is corrected by the first correction value based on the load in the outward path. On the other hand, when the outward load is less than or equal to the threshold value, the operation of the wiper arm is corrected by the second correction value based on the wind load due to the wind during traveling. As a result, the detection of the surface load due to the state of the surface to be wiped and the wind load due to the wind during traveling can be identified according to the same standard, and it is possible to accurately grasp which load has the greater influence, and it is possible to improve the detection accuracy of the wiper wiping state.

In the wiper control method, the wind load may be calculated based on a difference between the outward load and a return load generated in the motor when the wiper blade moves from the upper inversion position to the lower inversion position. Further, the outward load and the return load may be calculated based on an amount of current supplied to the motor, a voltage applied to the motor, a traveling speed of the vehicle, and an outside air temperature.

In addition, a wiper control device according to the disclosure is a device for controlling an operation of a wiper device, and the wiper device includes: a wiper blade disposed on a windshield of a vehicle; a wiper arm to which the wiper blade is attached and is driven back and forth between an upper inversion position and a lower inversion position set on the windshield; and a motor for driving the wiper arm. The wiper control device includes: a motor load calculation part that detects a load generated in the motor when the wiper blade moves on the windshield; a motor load determination part that compares an outward load generated in the motor when the wiper blade moves from the lower inversion position to the upper inversion position with a predetermined threshold value; and a wiper operation correction part that corrects an operation of the wiper arm by a first correction value set based on the outward load when the outward load of the motor exceeds the predetermined threshold value, and corrects the operation of the wiper arm by a second correction value set based on a wind load of the motor generated by a wind received by the vehicle during traveling when the outward load is less than or equal to the threshold value.

In the disclosure, the load of the motor due to the state of the surface to be wiped is detected by the load calculation part, and the load on the outward path and the threshold value are compared by the motor load determination part. When the outward load exceeds the threshold value, the wiper operation correction part corrects the operation of the wiper arm by the first correction value based on the outward load. On the other hand, when the outward load is less than or equal to the threshold value, the wiper operation correction part corrects the operation of the wiper arm by the second correction value based on the wind load due to the wind during traveling. As a result, the detection of the surface load due to the state of the surface to be wiped and the wind load due to the wind during traveling can be identified according to the same standard, and it is possible to accurately grasp which load has the greater influence, and it is possible to improve the detection accuracy of the wiper wiping state.

In the wiper control device, the motor load calculation part may calculate the outward load generated in the motor when the wiper blade moves from the lower inversion position to the upper inversion position, and may calculate a return load generated in the motor when the wiper blade moves from the upper inversion position to the lower inversion position, and the wiper operation correction part may calculate the wind load based on a difference between the outward load and the return load. Further, the motor load calculation part may calculate the outward load and the return load based on an amount of current supplied to the motor, a voltage applied to the motor, a traveling speed of the vehicle, and an outside air temperature.

Effects of Invention

According to the wiper control method of the disclosure, the load due to the state of the surface to be wiped in the outward path is determined, and if it exceeds the threshold value, the operation of the wiper arm is corrected by the first correction value based on the load in the outward path; when the outward load is less than or equal to the threshold value, the operation of the wiper arm is corrected by the second correction value based on the wind load due to the wind during traveling. Therefore, the detection of the surface load due to the state of the surface to be wiped and the wind load due to the wind during traveling can be identified according to the same standard. As a result, it is possible to accurately grasp which load has the greater influence, and it is possible to improve the detection accuracy of the wiper wiping state.

According to the wiper control device of the disclosure, it includes the load calculation part that detects the load of the motor due to the state of the surface to be wiped, the motor load determination part that compares the load in the outward path and the threshold value, and the wiper operation correction part that corrects the operation of the wiper arm by the first correction value based on the outward load if the outward load exceeds the threshold value, and corrects the operation of the wiper arm by the second correction value based on the wind load due to the wind during traveling when the outward load is less than or equal to the threshold value. Therefore, the detection of the surface load due to the state of the surface to be wiped and the wind load due to the wind during traveling can be identified according to the same standard. As a result, it is possible to accurately grasp which load has the greater influence, and it is possible to improve the detection accuracy of the wiper wiping state.

DESCRIPTION OF THE EMBODIMENTS

Figure 1:
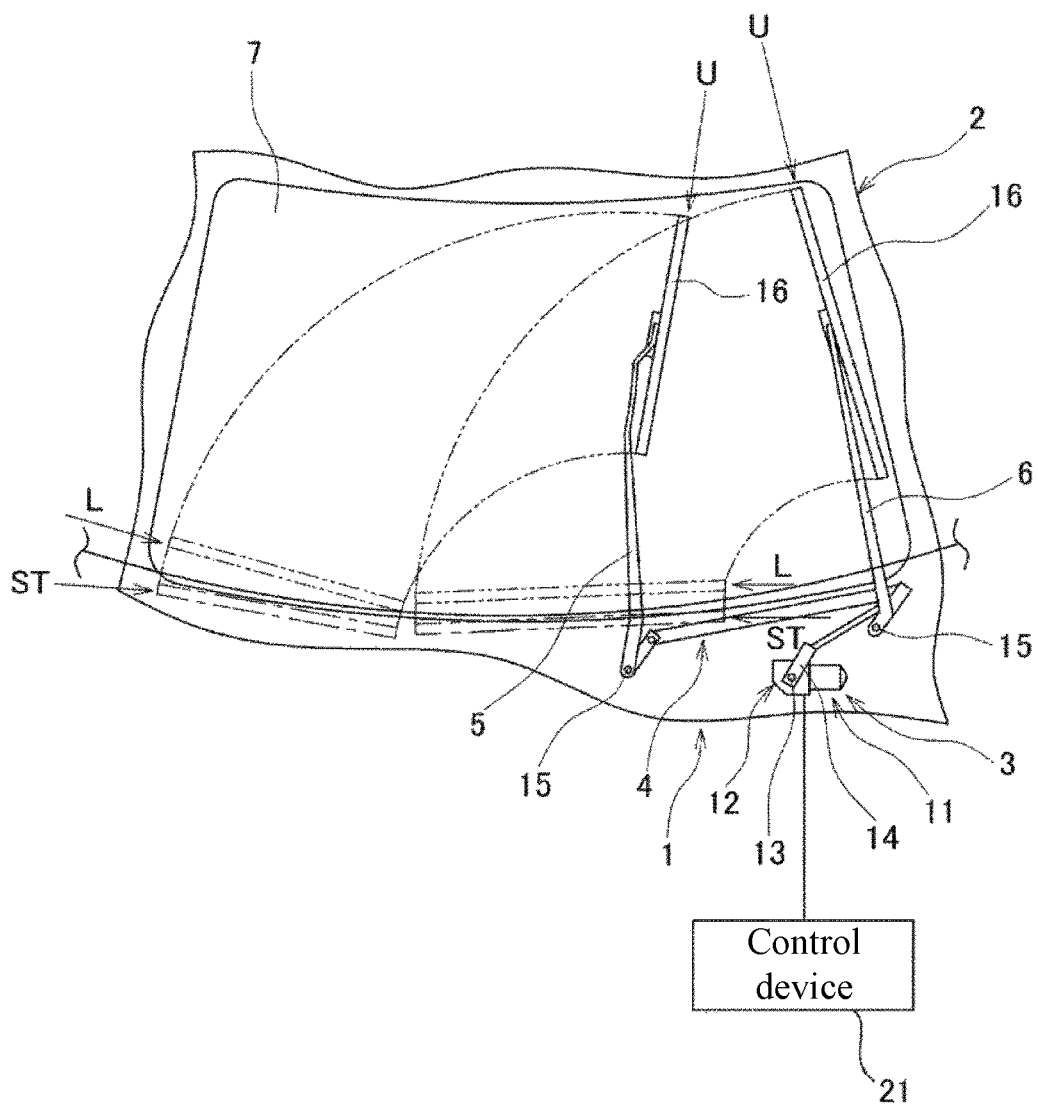
FIG. 1 is an illustration diagram showing a configuration of a wiper device to which the wiper control method/control device according to the embodiment of the disclosure is applied.

Hereinafter, embodiments of the disclosure will be described in detail with reference to the drawings. FIG. 1 is an illustration diagram showing a configuration of a wiper device to which the wiper control method/control device according to the embodiment of the disclosure is applied. As shown in FIG. 1, a wiper device 1 is mounted on an automobile (vehicle) 2 and driven by a wiper motor 3. The wiper motor 3 is connected to a pair of wiper arms 5 and 6 via a link mechanism 4. The wiper motor 3 includes a motor part 11 using a DC brush motor and a deceleration mechanism part 12 that decelerates and outputs the rotation of the motor part 11. The motor used for the motor part 11 is not limited to the DC brush motor, and may be a brushless motor or another type of motor.

A deceleration mechanism using a worm gear is housed in the deceleration mechanism part 12. A motor rotation shaft extends from the motor part 11 to the deceleration mechanism part 12, and a worm (not shown) is fixed to the motor rotation shaft. An output shaft 13 is fixed to a worm wheel (not shown) that meshes with the worm. A crank arm 14 is attached to the output shaft 13, and the crank arm 14 is connected to the link mechanism 4. The link mechanism 4 is formed with a pair of wiper shafts 15 as fulcrums, and the pair of wiper arms 5 and 6 swing around the wiper shafts 15 as fulcrums by rotating the crank arm 14 in the forward and reverse directions by rotating the motor part 11 in the forward and reverse directions.

A wiper blade 16 is detachably attached to each of the wiper arms 5 and 6. The wiper arms 5 and 6 perform a reciprocating wiping operation in a wiping area between the upper inversion position U and the lower inversion position L set on the windshield 7. In this case, the movement from the lower inversion position L to the upper inversion position U is the outward operation, and the movement from the upper inversion position U to the lower inversion position L is the return operation. When the wiper device 1 is not used, the wiper arms 5 and 6 and the wiper blades 16 are stopped and housed in the storage position ST set below the lower inversion position L.

Figure 2:
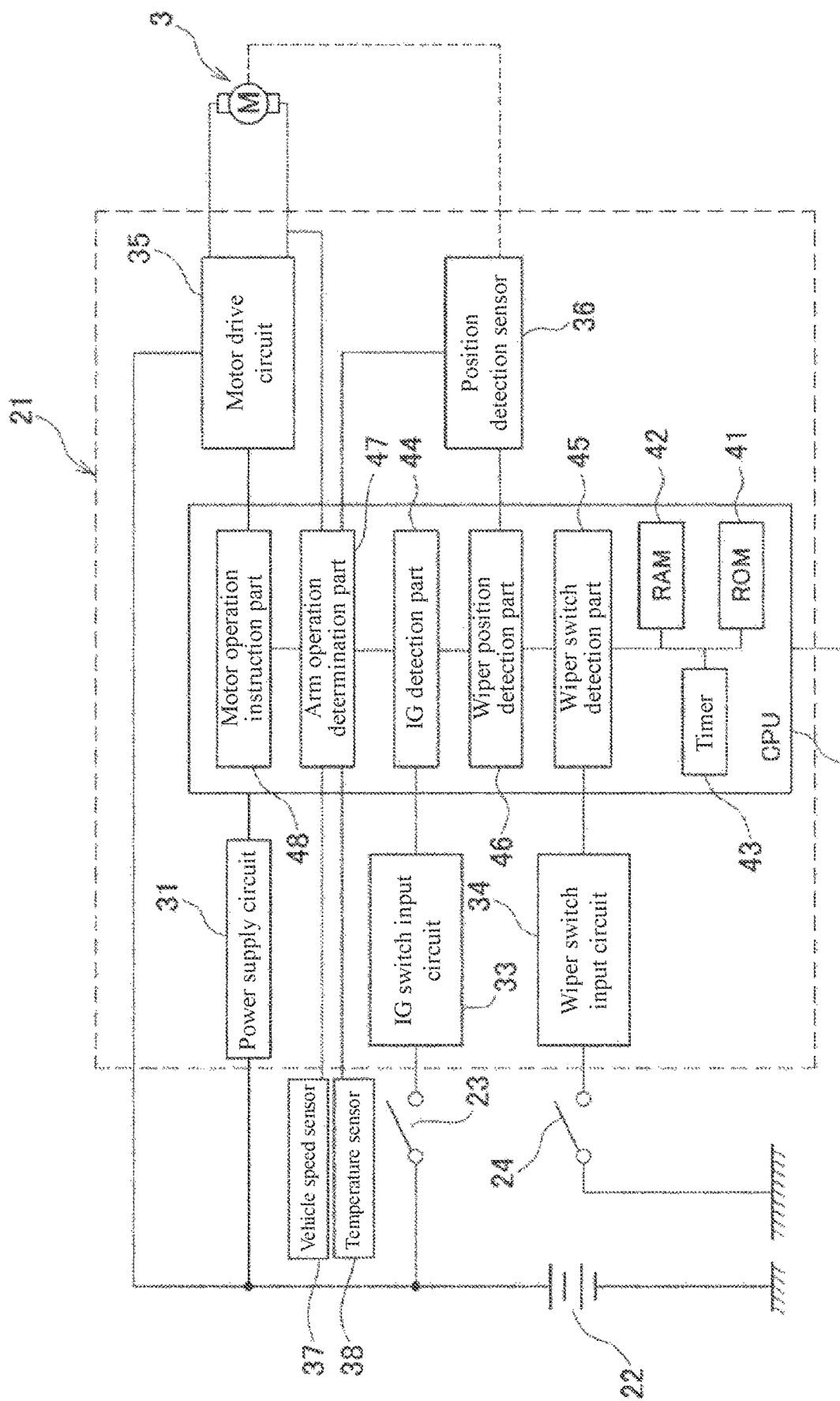
FIG. 2 is a block diagram showing a configuration of the wiper drive device.

In the wiper device 1, the operations of the wiper arms 5 and 6 are controlled by the wiper drive device 21. FIG. 2 is a block diagram showing a configuration of the wiper drive device 21, and the wiper drive device 21 is controlled by the control method according to the disclosure. As shown in FIG. 2, the wiper drive device 21 receives power supply from a power source (battery) 22 and is electrically connected to an ignition switch 23 and a wiper switch 24 disposed in the vehicle interior. The wiper switch 24 has LO, HI, and INT mode positions, and the wiper drive device 21 controls the operation of the wiper motor 3 in response to a switch operation by the driver, and operates the wiper arms 5 and 6 according to each mode.

The wiper drive device 21 includes a power supply circuit 31, a central processing unit (CPU: wiper control device) 32 which is a wiper control part, an ignition (IG) switch input circuit 33, a wiper switch input circuit 34, a motor drive circuit 35, and a position detection sensor 36. Further, the wiper drive device 21 is connected to a vehicle speed sensor 37 that detects the speed of the automobile 2 and a temperature sensor 38 that detects the outside air temperature.

The vehicle speed sensor 37 and the temperature sensor 38 are installed in the automobile 2 separately from the wiper device 1.

The power supply circuit 31 converts the voltage of the power supply 22 into the operating voltage of the CPU 32 and supplies it to the CPU 32. The CPU 32 has a read only memory (ROM) 41, a random access memory (RAM) 42, a timer 43, and the like. The ROM 41 stores various control programs and data such as a program for executing the control method according to the disclosure. When the IG switch 23 of the automobile 2 is turned on, the IG switch input circuit 33 outputs a signal corresponding thereto to the CPU 32. When the wiper switch 24 is turned on (LO, HI, INT), the wiper switch input circuit 34 outputs a signal corresponding to each mode to the CPU 32. The motor drive circuit 35 has a switching element such as a FET, and controls energization to the wiper motor 3. The position detection sensor 36 is a sensor for detecting the position of the wiper blade 16 based on the rotation angle of the motor, and a magneto-resistance sensor is used here.

Corresponding to the position detection sensor 36, the output shaft 13 of the deceleration mechanism part 12 is provided with a magnet for rotation detection in which the N pole and the S pole are magnetized in the circumferential direction, and the magneto-resistance sensor is disposed in close proximity to the magnet. When the wiper motor 3 is driven, the magnet for rotation detection also rotates with the rotation of the output shaft 13, and the position detection sensor 36 outputs a signal each time the magnetic pole of the magnet for rotation detection is switched. This signal is sent to the CPU 32, and by performing data processing on the signal, the position of the wiper blade 16 is calculated and detected. A Hall IC or the like may be used as the position detection sensor 36.

In addition to the ROM 41 and the like, the CPU 32 includes an IG detection part 44 that receives a signal from the IG switch input circuit 33 to activate the CPU 32, a wiper switch detection part 45 that detects the operating state of the wiper switch 24 by receiving a signal from the wiper switch input circuit 34, and a wiper position detection part 46 that receives a signal from the position detection sensor 36 and recognizes the current positions of the wiper arms 5 and 6. Further, the CPU 32 further includes an arm operation determination part 47 that determines the operation control state of the wiper arms 5 and 6 based on the operating state of the wiper switch 24 and the current positions of the wiper arms 5 and 6, and a motor operation instruction part 48 that gives an instruction to the motor drive circuit 35 to operate the wiper motor 3 based on the determination of the arm operation determination part 47.

Figure 3:
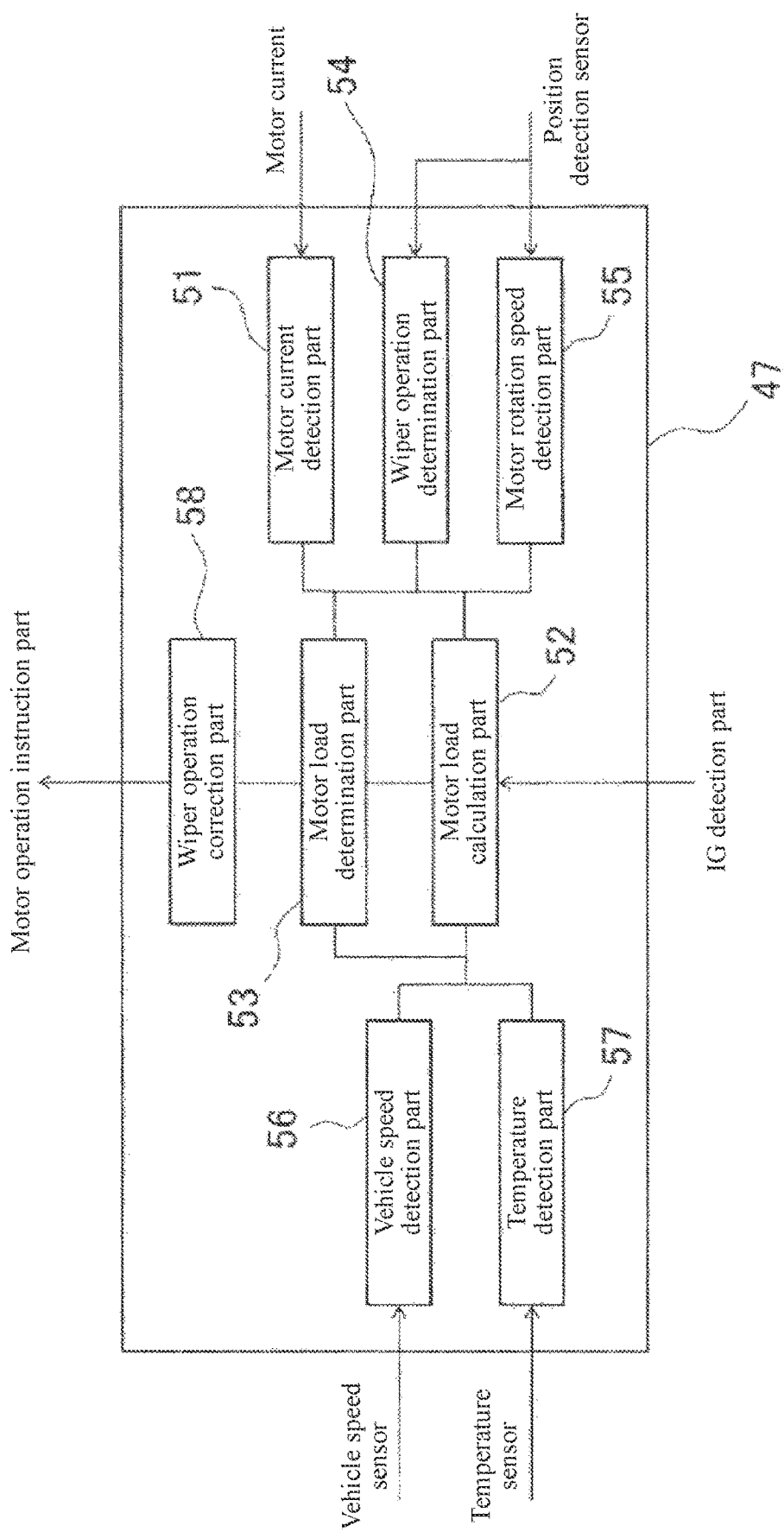
FIG. 3 is a block diagram showing a configuration of the arm operation determination part in the wiper drive device.

FIG. 3 is a block diagram showing the configuration of the arm operation determination part 47. The arm operation determination part 47 includes a motor current detection part 51 that detects the amount of current supplied to the wiper motor 3; a motor load calculation part 52 that calculates the load of the motor based on the motor supply current amount detected by the motor current detection part 51, the motor rotation speed, the vehicle speed, the air temperature and the like; and a motor load determination part 53 that determines the load state (high/low) by comparing the calculated motor load with a predetermined threshold value. Further, the arm operation determination part 47 includes a wiper operation determination part 54 that determines the current operation state (outward operation or return operation) of the wiper arms 5 and 6, a motor rotation speed detection part 55 that detects the rotation speed of the wiper motor 3 based on the signal from the position detection sensor 36, a vehicle speed detection part 56 that detects the current speed of the automobile 2 based on the signal from the vehicle speed sensor 37, and a temperature detection part 57 that detects the current outside air temperature based on the signal from the temperature sensor 38. In addition, the arm operation determination part 47 includes a wiper operation correction part 58 that adjusts the rotation speed and rotation angle of the wiper motor 3 based on the wiper operation direction, the motor load, and the like to correct the operation of the wiper arms 5 and 6.

Figure 4:
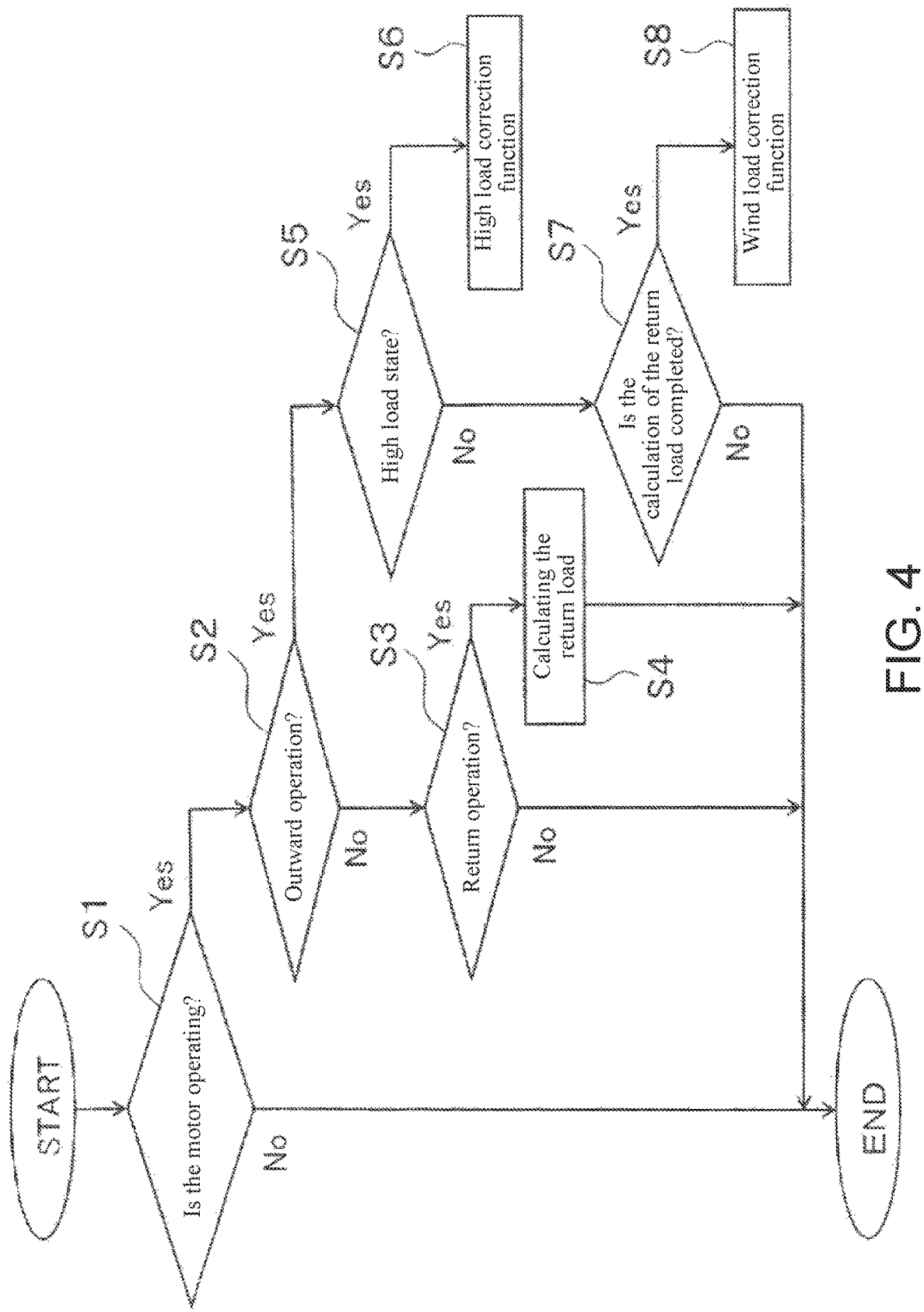
FIG. 4 is a flowchart showing a procedure of a wiper control process based on the disclosure.
Figure 5:
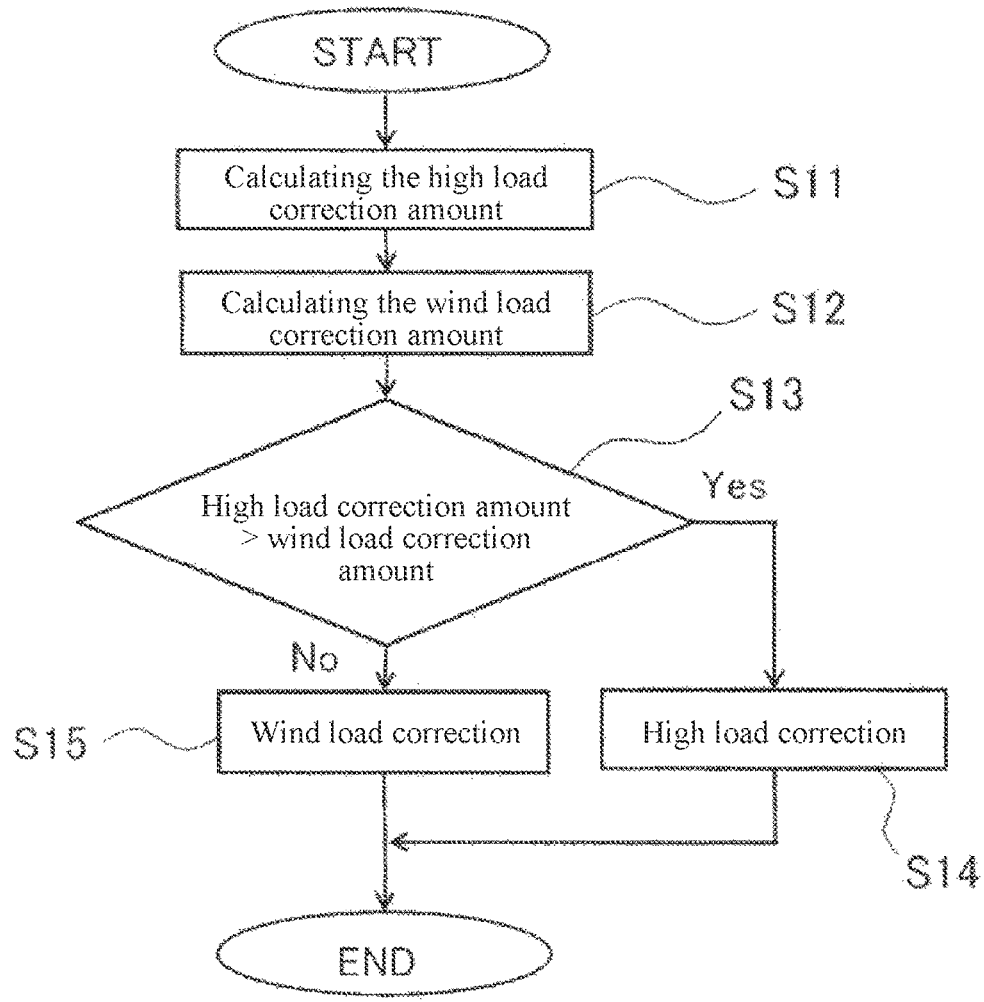
FIG. 5 is a flowchart showing a wiper control process in a conventional control wiper.

The operation of such a wiper device 1 is controlled by the wiper drive device 21 as follows. FIG. 4 is a flowchart showing a procedure of a wiper control process based on the disclosure, and the process is executed by the CPU 32. In the process of FIG. 4, when the ignition switch 23 is turned on and the wiper switch 24 is turned on, it is first determined whether the wiper motor 3 is operating (S1). The CPU 32 determines whether the wiper motor 3 is currently in the operating state by the wiper operation determination part 54 of the arm operation determination part 47, and when the wiper motor 3 is not operating, that is, when the motor is stopped, the CPU 32 exits the routine as it is. On the other hand, when the wiper motor 3 is operating, the process proceeds to S2, and the wiper operation determination part 54 determines whether the wiper arms 5 and 6 are in the outward operation.

If it is determined in S2 that the wiper arms 5 and 6 are not in the outward operation, the process proceeds to S3, and it is determined whether the wiper arms 5 and 6 are currently in the return operation. For example, when the wiper arms 5 and 6 reach the inversion position and it is determined in S3 that they are not in the return operation, the routine is exited as it is. If it is determined in S3 that the wiper arms 5 and 6 are in the return operation, the process proceeds to S4, and the motor load calculation part 52 calculates the motor load (return load) in the return path, and exits the routine. At this time, the return load is comprehensively estimated and calculated based on the motor supply current amount, the motor rotation speed, the vehicle speed, the air temperature, and the like.

On the other hand, if it is determined that the wiper arms 5 and 6 are in the outward operation, the process proceeds to S5, and the current motor load is calculated, and it is determined whether it is in the "high load" region. The process of S5 is executed by the motor load calculation part 52 and the motor load determination part 53, and the motor load (outward load) calculated by the motor load calculation part 52 based on the motor supply current amount, the motor rotation speed, the vehicle speed, the air temperature, and the like is compared with a predetermined threshold value to determine the load state. In this case, the threshold value for determining whether the load is high (for example, % of the motor rating) is set in advance according to the vehicle type, blade form, and the like, and is stored in the ROM 41. When the outward load exceeds the threshold value and it is determined in S5 that it is the high load state, the process proceeds to S6, and the wiper operation correction part 58 performs high load correction process (first load processing correction).

In the high load correction process of S6, the wiper operation correction part 58 calculates the correction amount of the rotation speed and the rotation angle of the wiper motor 3 based on the outward load calculated by the motor load calculation part 52. The correction value (first correction value) at this time is also stored in the ROM 41 in the form of a map or the like having the motor load as a parameter. Then, in a form that reflects the calculated correction amount, the arm operation determination part 47 gives an instruction to the motor drive circuit 35 to operate the wiper motor 3. For example, when the wiper device 1 is operated when the windshield 7 is in a dry state, and the motor load is large due to the frictional resistance between the glass surface and the wiper blade 16, measures such as increasing the output of the wiper motor 3 to maintain the wiping speed are taken. As a result, wiper control is performed according to the state of the glass surface, and smooth and stable wiping operation may be performed.

When the outward load is less than or equal to the threshold value and it is determined in S5 that it is not the high load state, the process proceeds to S7, and it is confirmed whether the calculation of the return load is completed. If the return load has not been calculated yet, the routine is exited to wait for the calculation of the return load by S4. On the other hand, if the process of S4 is performed and the return load has already been calculated, the process proceeds to S8, and the wind load correction process (second load processing correction) is performed by the wiper operation correction part 58.

Figure 6:
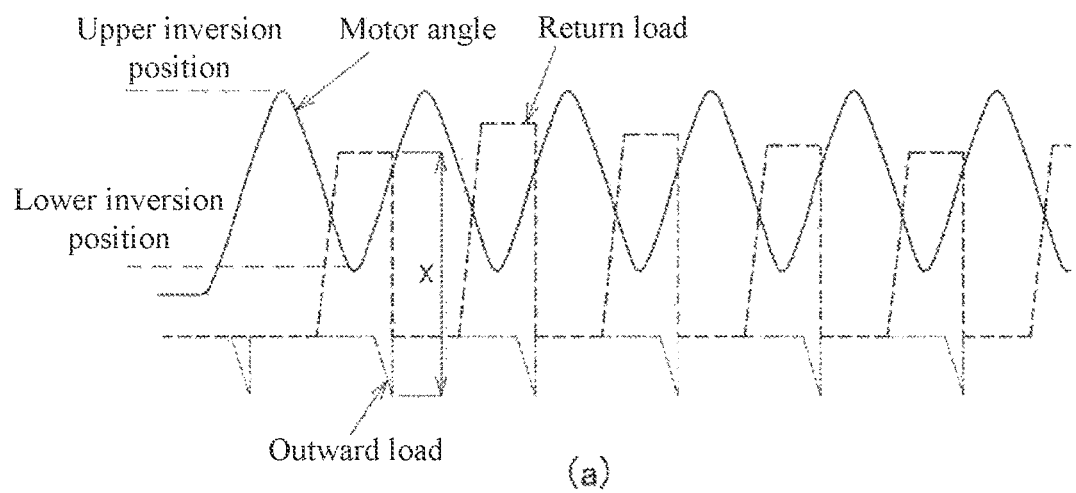
FIG. 6 is an illustration diagram showing a load of a wiper motor, in which (a) shows the time of low load, and (b) shows the time of high load, respectively.
Figure 6:
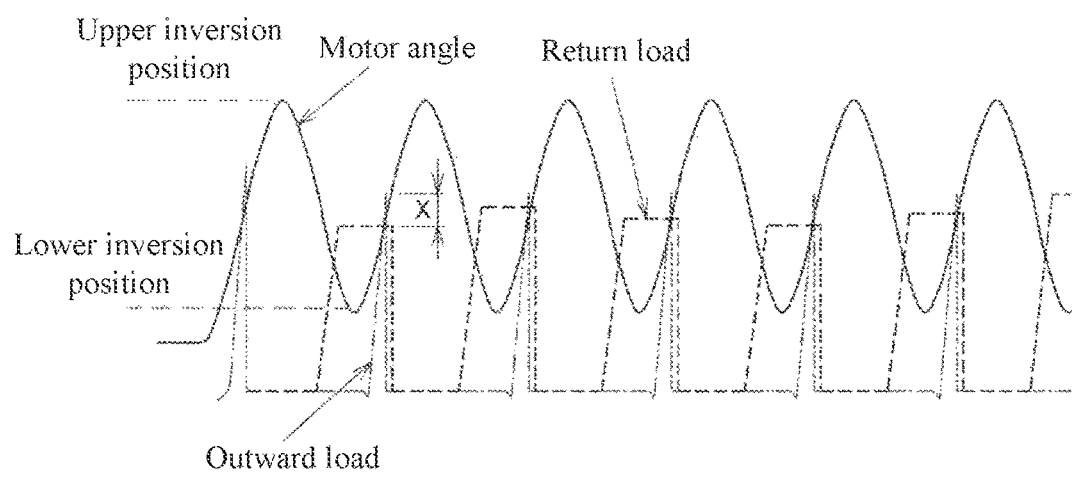

In the wind load correction process of S8, the correction amount of the rotation speed and the rotation angle of the wiper motor 3 is calculated by the wiper operation correction part 58 based on the difference X (see FIG. 6) between the motor load on the outward path and the motor load on the return path calculated by the motor load calculation part 52. The correction value (second correction value) at this time is also stored in the ROM 41 in the form of a map or the like having the load difference X between the outward path and the return path as a parameter. Then, in a form that reflects the calculated correction amount, the arm operation determination part 47 gives an instruction to the motor drive circuit 35 to operate the wiper motor 3. For example, when the wiper blade 16 receives a strong wind during traveling, such as when the wiper device 1 is operated while the automobile 2 is traveling at high speed, the output of the wiper motor 3 is controlled based on the difference X between the outward load and the return load to maintain the wiping speed, and measures such as suppressing overrun at the upper inversion position are taken.

As a result, the wiper control is performed according to the state (strength and weakness) of the wind during traveling, the influence of the wind can be suppressed, the stable wiping speed can be maintained, and the overrun at the upper inversion position can be suppressed. Moreover, the wind load correction here is different from the conventional correction based only on the motor output detection, and it is based on the load estimation value calculated in comprehensive consideration of the motor supply current amount, the motor rotation speed, and the like; therefore, the wiper operation can be controlled with higher accuracy, and the overrun control of the upper inversion position can be performed with higher accuracy.

As described above, in the wiper control according to the disclosure, the high load due to the state of the surface to be wiped is determined in the outward path (S2→S5), and the wind load due to the wind during traveling is corrected by the difference X between the outward path and the return path (S7→S8). Further, both the high load and the wind load are calculated by load estimation calculation using the motor supply current amount, the motor rotation speed, the vehicle speed, the air temperature, and the like (S6, S8). Then, the high load correction process is performed with priority over the wind load correction process (S5 to S8). Therefore, conventionally, high load detection and wind load detection were determined separately by different standards, and it was difficult to make a simple comparison between the two. In contrast, in the disclosure, the same load estimation calculation value is used for comparison based on the same standard, and it becomes possible to accurately identify which of the glass surface load and the wind load has the greater influence, and the detection accuracy of the wiper wiping condition can be improved.

As a result, highly accurate wiper control can be performed according to the state of the glass surface, and smooth and stable wiping operation is possible while maintaining the wiping speed, and stick slip at the inversion position can also be dealt with swiftly, and overrun can be suppressed with higher accuracy. As a result, the upper inversion position can be brought closer to the pillar, and a wider wiping area can be set than conventional technique, and the driver's field of vision can be improved.

It goes without saying that the disclosure is not limited to the above-described embodiments and can be variously modified without departing from the gist thereof. For example, the wiper device 1 described above is configured to drive two wipers on the driver's seat side and the passenger's seat side by one wiper motor 3, but the disclosure is also applicable to a two-motor type wiper device in which two wipers are driven by separate motors.

INDUSTRIAL APPLICABILITY

The disclosure can be widely applied not only to wiper devices for automobiles but also to wiper devices of industrial machines and the like used at construction sites and the like.

What is claimed is:

1. A wiper control method for controlling a wiper device, wherein the wiper device comprises:
    a wiper blade disposed on a windshield of a vehicle;
    a wiper arm to which the wiper blade is attached and is driven back and forth between an upper inversion position and a lower inversion position set on the windshield; and
    a motor for driving the wiper arm, and
    wherein the wiper control method comprises:
        detecting an outward load generated in the motor when the wiper blade moves from the lower inversion position to the upper inversion position;
        determining whether to correct an operation of the wiper by a first correction value and a second correction value by comparing the outward load of the motor to a predetermined threshold value;
        correcting an operation of the wiper arm by the first correction value set based on the outward load in response to a determination of the outward load of the motor exceeding a predetermined threshold value; and
        correcting the operation of the wiper arm by the second correction value set based on a wind load of the motor generated by a wind received by the vehicle during traveling in response to a determination of the outward load being less than or equal to the threshold value.

2. The wiper control method according to claim 1, wherein the wind load is calculated based on a difference between the outward load and a return load generated in the motor when the wiper blade moves from the upper inversion position to the lower inversion position.

3. The wiper control method according to claim 2, wherein the outward load and the return load are calculated based on an amount of current supplied to the motor, a voltage applied to the motor, a traveling speed of the vehicle, and an outside air temperature.

4. A wiper control device for controlling an operation of a wiper device, wherein the wiper device comprises:
    a wiper blade disposed on a windshield of a vehicle;
    a wiper arm to which the wiper blade is attached and is driven back and forth between an upper inversion position and a lower inversion position set on the windshield; and
    a motor for driving the wiper arm, and
    wherein the wiper control device comprises:
        a motor load calculation part that detects a load generated in the motor when the wiper blade moves on the windshield;
        a motor load determination part that compares an outward load generated in the motor when the wiper blade moves from the lower inversion position to the upper inversion position with a predetermined threshold value; and
        a wiper operation correction part that corrects an operation of the wiper arm by a first correction value set based on the outward load in response to a determination of the outward load of the motor exceeding the predetermined threshold value, and corrects the operation of the wiper arm by a second correction value set based on a wind load of the motor generated by a wind received by the vehicle during traveling in response to a determination of the outward load being less than or equal to the threshold value.

5. The wiper control device according to claim 4, wherein the motor load calculation part calculates the outward load generated in the motor when the wiper blade moves from the lower inversion position to the upper inversion position, and calculates a return load generated in the motor when the wiper blade moves from the upper inversion position to the lower inversion position, and
    the wiper operation correction part calculates the wind load based on a difference between the outward load and the return load.

6. The wiper control device according to claim 5, wherein the motor load calculation part calculates the outward load and the return load based on an amount of current supplied to the motor, a voltage applied to the motor, a traveling speed of the vehicle, and an outside air temperature.

* * * * *